United States Patent Office.

ISAAC J. WYMAN, OF NEW YORK, N. Y.

Letters Patent No. 111,295, dated January 24, 1871.

IMPROVEMENT IN PAINTS FOR SHIPS' BOTTOMS.

The Schedule referred to in these Letters Patent and making part of the same.

I, ISAAC J. WYMAN, of the city, county, and State of New York, have made a new and useful Improvement in "Paint for the Bottoms of Maritime Vessels," and I hereby declare the following language is a full and exact description and example thereof.

The value and nature of this improvement consist in the use of metallic copper in a fine state of division, mixed with boiled or burned linseed-oil, and other substances which impart a body to the mass, for the purpose of forming a paint for the bottoms of vessels that will prevent the adhesion thereto of barnacles or other matter which usually attaches itself to vessels' bottoms to render them what is termed "foul."

It has been long observed that vessels sheathed with copper do not foul.

It is also well known to chemists that metallic copper immersed in sea-water is attacked by the salts contained therein, with the formation of a small quantity of dichloride of copper upon the external surface of said copper, which dichloride of copper is a very soluble salt, and is at once dissolved by the water of the sea, while the newly-exposed surface is again attacked with the formation of more dichloride of copper, &c.

This salt, dichloride of copper, is a very powerful escharotic to all living animal and vegetable tissues, and as it is formed upon the exterior surfaces of the copper and the copper is attached to the vessel, no adhesion of vegetable or animal substances can be made thereto, because the dichloride cauterizes the vegetable matters, and the animals or insects possessing life and sensation prefer to keep away from it on the principle of incompatibility.

In preparing the copper it is necessary to procure the same in a very minute state of division, on account of the difficulty of subdividing it by trituration.

For this purpose it is best to use a soluble salt of copper, as the sulphate, chloride, acetate, or nitrate, but I prefer the sulphate, on account of economy.

Into a solution of sulphate or other soluble salt of copper I immerse iron wires or rods, and agitate the solution with the rods by alternate rotary motions, until all the copper is precipitated in the form of a fine powder.

I then wash the precipitate with a large quantity of water to remove all soluble matter, and dry it out of contact with the air.

Having now procured the metallic copper, I mix it with any burned or boiled-oil paint possessing sufficient body, in any desirable proportions, and pass it through a paint-mill.

The product of this last grinding constitutes the paint herein described, and is ready for application to the bottoms of iron and wooden maritime vessels.

This product of paint is also applicable to the roofs of buildings, or would be serviceable wherever a paint is required in a position exposed to severe weather.

As this improvement does not consist so much in a process as in a product which is easily recognized when met with, I do not claim a paint made by combining copper ore or oxide of copper with tar or bituminous compounds, as such is known; but

What I claim as my invention or improvement, and desire to secure by Letters Patent, is—

A paint, having as one of its ingredients metallic copper, as herein substantially described, and for the purposes herein set forth.

ISAAC J. WYMAN.

Witnesses:
AUGUSTUS LELAND,
WM. S. SHERWOOD.